No. 628,536. Patented July 11, 1899.
T. HERBST.
MANUFACTURE OF SCREENS FOR PHOTOPRINTING PROCESSES.
(Application filed June 2, 1898.)
(No Model.)
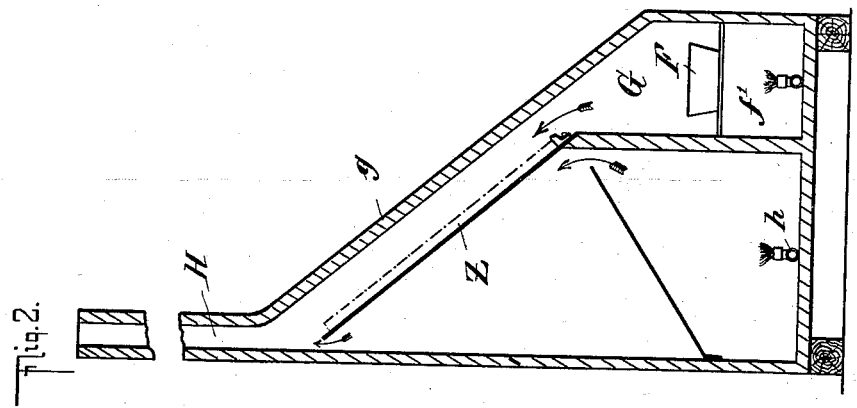
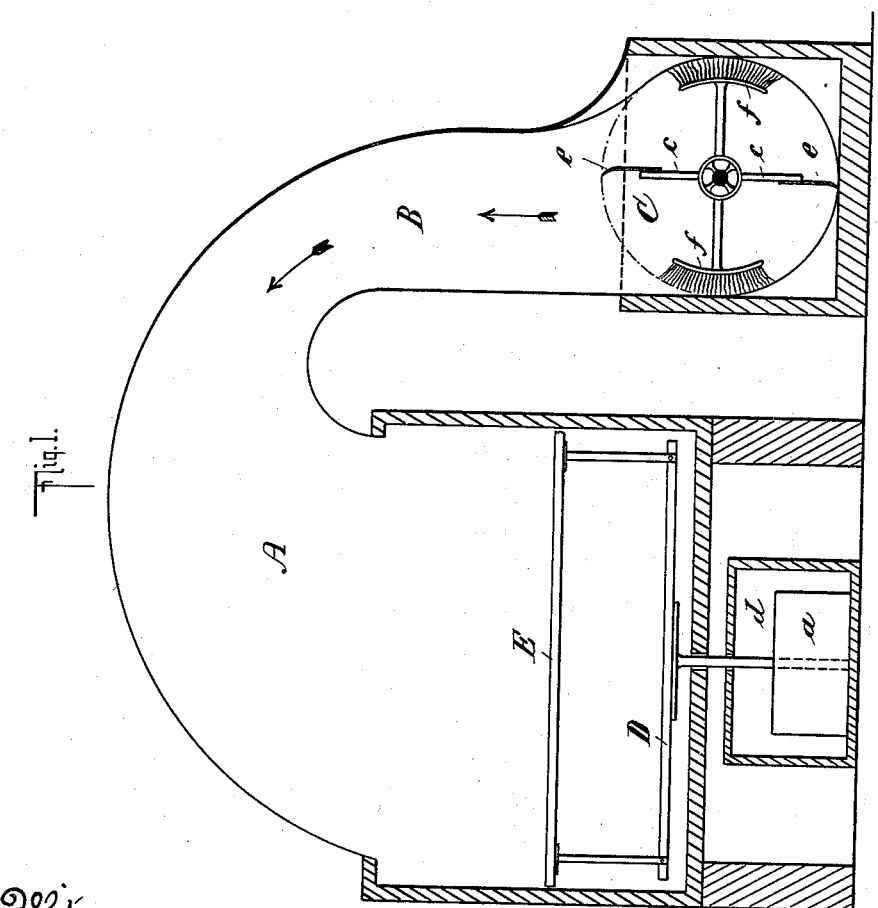

UNITED STATES PATENT OFFICE.

THEODOR HERBST, OF FRANKFORT-ON-THE-MAIN, GERMANY.

MANUFACTURE OF SCREENS FOR PHOTOPRINTING PROCESSES.

SPECIFICATION forming part of Letters Patent No. 628,536, dated July 11, 1899.

Application filed June 2, 1898. Serial No. 682,325. (No model.)

*To all whom it may concern:*

Be it known that I, THEODOR HERBST, painter, of Frankfort-on-the-Main, Germany, have invented new and useful Improvements in the Manufacture of Screens for Photoprinting Processes, of which the following is a specification.

Heretofore grained-glass plates or screens for photoprinting processes have been made either by engraving in regular lines or by etching by means of hydrofluoric acid, the latter process being effected by first dusting the plates with asphalt, then melting the asphalt, and afterward etching the uncovered places by means of the vapor of hydrofluoric acid.

Grained plates or screens produced according to the last-mentioned process present an irregular graining, which for most photographic purposes is preferable to that of the geometrically-grained screens; but it was not hitherto possible by means of this process to produce plates of a greater size than, say, seven and one-half by seven and one-half centimeters and it was also not possible to produce the etchings with such sharpness as to render the screens fully equal to the geometrically-ruled screens. Now according to the present process screens can be made of any desired size and with all desired sharpness. This end is attained by the use of a special dusting process, whereby a uniform distribution of the asphalt dust in settling is effected over the whole dusted surface, and by special manipulations in the etching operation. The dusting operation is preferably effected in a closed space in such a manner that only the finest particles of dust are allowed to settle upon the glass plate under treatment. In a closed space a dusting-powder composed of a mixture of asphalt and "dragon's-blood" is thrown up into the condition of a whirling cloud by stirring or agitating. The cloud of dust thus produced rises up along a vertical channel or passage connected at top with the dusting-chamber, so that only the very lightest particles pass into this second chamber, on whose bottom is provided a rotating support for the glass plate or screen to be grained and along with which there also rotates a fine-meshed sieve. Upon the plate so treated the dust is melted in the usual manner. The drawbacks of the etching operation hitherto employed are considerably counteracted by uniformly heating the plate while the latter is exposed to the vapors of the hydrofluoric acid, the vapors being prevented by this means from condensing upon the plate. The improved arrangement has also the effect of causing the vapors to pass over and not under the plate. The result is to produce a comparatively weak and accurately-distributed action of the hydrofluoric acid upon the uncovered portions of the glass plate, violent impact of the vapors upon the plate being entirely obviated, while any accumulation of liquid hydrofluoric acid upon the plate, resulting in the harmful eating away of the glass under the dusted places, is prevented by the admixture in the asphalt of dragon's-blood as well as by the heating of the plates.

The process is carried out in practice in the following manner by means of the apparatus shown in the accompanying drawings.

In the drawings, Figures 1 and 2 represent vertical sectional views of the apparatus employed in carrying out my process and which constitute a part of my invention.

Referring to Fig. 1, A is the dusting-chamber, which is connected by means of the passage B with the dust-cloud-producing chamber. In the chamber A there is arranged a rotary disk D, serving as a support for the glass plate to be treated. The disk D is mounted on an axle $d$ and is adapted to be rotated by means of clockwork $a$. The sieve E rotates with disk D. The mixture of finely-powdered asphalt and dragon's-blood is introduced into the dust-cloud-producing chamber C, wherein the stirring device comprising revolving arms $c$, with the leather pallets $e$ and brushes $f$, stir the dust and throw it upward. Only the very finest particles pass out of the channel B into the chamber A, and, passing through the sieve E, settle upon the plate carried on the disk D. The plate thus treated is heated in any desired manner, so as to produce adhesion of the dust by its melting on the plate. Further, the back of the plate receives a coating of a suitable varnish, whereby it is protected from the action of the hydrofluoric acid. The plate thus prepared is placed in the apparatus shown in section in Fig. 2.

F is the vessel from which hydrofluoric-acid gas is generated by the action of the flame $f'$. The gas rises through the chamber G, at the upper end of which is placed the glass plate Z to be etched, the plate being disposed in any suitable manner—for example, it may be simply laid upon its back—so that the hydrofluoric-acid gas must pass along between it and the wall $g$ of the chamber on its way to the uptake H. Below the glass plate Z is arranged a second heating-flame $h$, the heated gases from which are caused to impinge upon the back or under side of the plate Z, so as to heat the latter sufficiently to prevent condensation of the hydrofluoric-acid vapors upon it.

I do not herein claim the apparatus for carrying out the process, as the same forms the subject-matter of an application for patent filed by me June 3, 1899, Serial No. 719,197.

Now what I claim, and desire to secure by Letters Patent, is the following:

1. A process of continuously dusting glass plates for photoprinting purposes which consists in forcing up a cloud of dust of acid-resisting material and causing the finer particles of dust to rise higher than the larger ones and separating the finer particles of dust from the coarser particles thereof and causing the same to move laterally and fall upon the glass plate which is thereby dusted with fine particles only.

2. The process of manufacturing screens for photoprinting purposes which comprises applying an acid-resisting material to the glass plate to be treated, etching the plate with a current of gaseous hydrofluoric acid and heating the plate while etching to such a degree as to prevent condensation of the gaseous hydrofluoric acid thereon, substantially as described.

3. The herein-described process of producing etched glass plates for photo-engraving purposes and the like, which consists in dusting the plate with an acid-resisting material, thereupon heating the said plate to melt the dust and affix the same to the plate and subjecting the said coated plate to the action of a stream of gaseous hydrofluoric acid while heated to such a degree as to prevent condensation of the said gaseous hydrofluoric acid on the glass.

In testimony whereof I have signed my name to this specification in the presence of two subscribing witnesses.

THEODOR HERBST.

Witnesses:
JEAN GRUND,
FRANK H. MASON.